United States Patent
Sakamoto et al.

[11] Patent Number: 5,705,559
[45] Date of Patent: Jan. 6, 1998

[54] CROSSLINKED RESIN PARTICLES AND PRODUCTION THEREOF

[75] Inventors: Hiroyuki Sakamoto, Nishinomiya; Kenshiro Tobinaga, Kawanishi; Yasuyuki Tsuchiya; Hisaichi Muramoto, both of Hirakata; Yusuke Ninomiya, Nishinomiya; Keizou Ishii, Ashiya; Shinichi Ishikura, Tsuzuki-gun, all of Japan

[73] Assignee: Nippon Paint Co., Ltd., Osaka-fu, Japan

[21] Appl. No.: 391,091

[22] Filed: Feb. 21, 1995

Related U.S. Application Data

[63] Continuation of Ser. No. 826,237, Jan. 27, 1992, abandoned, which is a continuation of Ser. No. 376,594, Jul. 7, 1989, abandoned.

[30] Foreign Application Priority Data

Jul. 8, 1988 [JP] Japan ................... 63-171634
Mar. 28, 1989 [JP] Japan ..................... 1-75587

[51] Int. Cl.[6] ........................................ C08F 8/00
[52] U.S. Cl. .................. 524/531; 524/534; 524/811; 524/815; 524/818; 525/286; 525/293; 525/301; 525/312; 526/273; 526/315

[58] Field of Search ........................ 524/531, 534, 524/811, 815, 818; 525/286, 293, 301, 312; 526/273, 315

[56] References Cited

U.S. PATENT DOCUMENTS

| | | | |
|---|---|---|---|
| 4,130,518 | 12/1978 | Rybny et al. | 525/301 |
| 4,279,795 | 7/1981 | Yamashita et al. | 525/301 |
| 4,304,701 | 12/1981 | Das et al. | 525/286 |
| 4,608,314 | 8/1986 | Turpin et al. | |
| 4,619,964 | 10/1986 | Kielbania et al. | 525/301 |
| 4,670,173 | 6/1987 | Hayashi et al. | 525/301 |
| 4,820,777 | 4/1989 | Kanda et al. | 525/293 |

FOREIGN PATENT DOCUMENTS

| | | |
|---|---|---|
| A-0 272 500 | 6/1988 | European Pat. Off. |
| A-0 282 000 | 9/1988 | European Pat. Off. |
| A-3 234 491 | 3/1984 | Germany |

*Primary Examiner*—Bernard Lipman
*Attorney, Agent, or Firm*—Wenderoth, Lind & Ponack

[57] ABSTRACT

Disclosed is a process for preparing crosslinked resin particles which comprises dispersing a resin having both a water-dispersible function and a self-crosslinkable function in one molecule in an aqueous medium and then three-dimensionally crosslinking.

13 Claims, No Drawings

CROSSLINKED RESIN PARTICLES AND PRODUCTION THEREOF

This application is a continuation of now abandoned application, Ser. No. 07/826,237, filed Jan. 27, 1992, which was a continuation of now abandoned application Ser. No. 07/376,594 filed Jul. 7, 1989 now abandoned.

FIELD OF THE INVENTION

The present invention relates to crosslinked resin particles and a process for preparing the same.

BACKGROUND OF THE INVENTION

Crosslinked resin particles are widely used for paint, molding, adhesive, ink, cosmetics and the like. They are prepared by various methods, such as grinding, emulsion polymerization, suspension polymerization, microcapsulating, spray drying and so on. Since each method has particular advantage, a suitable method is selected according to the application or resin type of the particles.

In view of particle size, each method has particular size range. For example, the emulsion polymerization method produces particles of 0.01 to 0.3 micron, and the other methods produce relatively large particles of 5 to 100 microns. Thus, it is quite difficult to produce particles of 0.1 to 10 microns.

Accordingly, a method which produces particles of 0.01 to 50 microns, especially 0.1 to 10 microns in an industrial scale is desired.

SUMMARY OF THE INVENTION

The present invention provides a process for preparing crosslinked resin particles which comprises dispersing a resin having both water-dispersible function and self-crosslinkable function in one molecule in an aqueous medium and then three-dimensionally crosslinking.

The present invention also provides an aqueous emulsion containing the crosslinked resin particles.

The present invention further provides a process for preparing crosslinked resin particles which comprises dispersing an organic solvent solution containing resin with both water-dispersible function and self-crosslinkable function in one molecule in an aqueous medium, three-dimensionally crosslinking the dispersed resin particles and removing the organic solvent and the aqueous medium.

In the emulsion polymerization method, a crosslinking reaction occurs simultaneouly with a polymerization of monomers. In the present invention, a resin which has both water-dispersible function and crosslinkable function and which is not crosslinked is dispersed in an aqueous medium, and then the inside of the dispersed resin particles is three-dimensionally crosslinked to retain their particulate shapes.

DETAILED DESCRIPTION OF THE INVENTION

The resin employed in the present invention is one having both water-dispersible function and crosslinkable function. As long as a resin has such functions, any resin can be used. This means that the resin can be selected more freely than the emulsion polymerization method using only vinyl type resins. In other words, the present invention is applicable not only to condensation resins, and addition resins, but also to natural or synthetic rubber elastmers.

According to the present invention, by the term "water-dispersible function" is meant that the resin is stably retained in an aqueous medium at dispersed conditions in the size of moleculars or molecular aggregates. It includes such polyvinyl alcohol as is inherently dispersed stably in an aqueous medium. In case of a hydrophobic resin, a hydrophilic group (e.g. nonionic group, ionic group or amphoteric group) which is necessary for stably retaining the resin in an aqueous medium may be introduced therein.

By the term "self-crosslinkable function" is meant that the resin is capable of being itself crosslinked by light, heat and the like. For example, the resin contains radical reactive groups, or a combination of groups reactive with each other (e.g. oxirane and amine, oxirane and carboxyl, hydroxyl and alkoxy, etc.).

Typical examples of the resins having both water-dispersible and self-crosslinkable functions are an addition reaction product of polybutadiene having amine groups and methacrylic acid, a half-ester of maleic polybutadiene and 2-hydroxyethylmethacrylate, a modified polyether, a modified polyester and a modified acrylic resin and the like. A number average molecular weight of the resin is preferably within the range of 500 to 1,000,000, more preferably 1,000 to 100,000 for paint.

According to the present invention, the resin is dispersed in an aqueous medium. In order to reduce to a viscosity sufficient to mechanically emulsify the resin, an organic solvent (e.g. toluene, xylene, dichloroethane, chlorobenzene, cyclohexane etc.) can be mixed as a diluent in a suitable amount. According to the resin type or viscosity characteristics, such organic solvent can be eliminated. By the term "aqueous medium" herein is meant water or a mixture of water and other water-miscible solvents (e.g. lower alcohols, ethers etc.).

In order to produce composite resin particles, solid particles, such as pigments and drugs, are formulated into the dispersion.

The dispersion is then three-dimensionally crosslinked by means of light, heat and the like. The crosslinking reaction occurs within the dispersed particles and therefore the particles are crosslinked with keeping dispersing conditions.

The crosslinking reaction can be assisted by a crosslinking catalyst and/or a polymerization initiator, if necessary. The crosslinking catalyst can be one promoting a reaction between the reactive groups in the resin, including a tirtiary amine (e.g. tris(dimethylaminomethyl)phenol) where the reactive groups are a combination of oxirane and carboxyl. The polymerization initiator is generally a radical polymerization initiator, such as an azo initiator (e.g. azobisisobutylonitrile), a peroxide (e.g. ketone peroxides, allyl peroxides) and the like. The crosslinking reaction is generally carried out at a temperature of 20° to 110° C. preferably 40° to 90° C.

The obtained resin particles can be separated from the liquid component by removing the aqueous medium. The resin particles may be separated by salting out, spray drying, freeze drying and the like. The particles has a particle size of 0.01 to 50 microns, especially 0.1 to 10 microns. If an aqueous emulsion of the resin particles is necessary, the organic solvent if used is removed from the dispersion to form the aqueous emulsion. It may be prepared by dispersing the separated particles in another aqueous medium.

The resin particles can be used as a filler or functional particles for paint, ink, adhesive, mold, cosmetics. The coating containing the resin particles highly water-resistant, because an emulsifying agent is not employed when the resin is dispersed in the aqueous medium. If a part of the crosslinkable groups remains during the crosslinking reaction, the resin particles solution has curing ability.

The obtained resin particles may be formulated into aqueous paint, especially cationic electrocoating paint. In addition to the resin particles, the aqueous paint generally contains a film-forming resin and a pigment. Examples of the pigments are color pigments, such as titanium dioxide, iron oxide red and carbon black; extender pigments, such as aluminum silicate and precipitated barium sulfate; corrosion preventive pigments, such as aluminum phosphomolybdate, strontium chromate, basic lead silicate and lead chromate. Examples of the film-forming resins are an amine-modified epoxy resin, an amine-modified polybutadiene, polyether, polyester, polyurethane, polyamide, phenol resin, acrylic resin and the like. The paint is classified by curing mechanism. The first is self-curing type by radical polymerization or oxidation polymerization, the second is curing agent type using such curing agent as melamine resin and blocked polyisocyanate and the third is combination type of the first and the second. The aqueous paint may further contain a water-insoluble resin, such as epoxyacrylate resin, to improve film properties. The aqueous paint is adjusted to a solid content of 10 to 20% and coated in a dried thickness of 15 to 30 microns. The obtained film is baked to cure.

EXAMPLES

The present invention is illustrated by the following examples which, however, are not to be construed as limiting the present invention to their details. In the examples, "part" and "%" are based on weight unless otherwise indicated.

Reference Example 1

Preparation of a resin having both hydrophilic groups and crosslinkable groups

A four neck 5 liter flask equipped with a stirrer, a condenser and a thermometer was charged with 720 parts of maleic polybutadiene (available from Nippon Soda Co., Ltd. as BN-1015), 735 parts of a 1:5 mol adduct of 2-hydroxyethyl methacrylate and epsilon-caprolactone (available from Daicel Chemical Industries, Ltd. as Plakcel FM-5, 365 parts of cyclohexanone and 0.1 part of hydroquinone, and reacted at 150° C. for one hour in air.

The obtained resin had a solid content of 80%, an average molecular weight of 2,920 and an acid value of 32. Radical polymerizable double bonds were identified by IR spectrum.

Reference Example 2

Preparation of a resin having both hydrophilic groups and crosslinkable groups

A four neck 2 liter flask equipped with a stirrer, a condenser and a thermometer was charged with 192 parts of trimellitic anhydride, 130 parts of 2-hydroxyethyl methacrylate, 100 parts of cyclohexanone and 0.1 part of hydroquinone, and reacted at 150° C. for 30 minutes in air. Then, 740 parts of polytetramethyleneglycol diglycidyl ether (available from Nagase Kasei Industries Ltd. as Denacol 992), 620 parts of cyclohexanone and 0.1 part of hydroquinone were added and reacted at 150° C. for one hour.

The obtained resin had a solid content of 80%, an average molecular weight of 2,120 and an acid value of 53. Radical polymerizable double bonds were identified by IR spectrum.

Reference Example 3

Preparation of a resin having both hydrophilic groups and crosslinkable groups

A four neck 2 liter flask equipped with a stirrer, a condenser, a nitrogen gas inlet and a thermometer was charged with 15 parts of methacrylic acid, 25 parts of glycidyl methacrylate, 50 parts of 1:23 mol adduct of methacrylic acid and ethylene oxide (available from Shinnakamura Chemical Co., Ltd. as NK-230), 200 parts of styrene, 160 parts of methyl methacrylate, 150 parts of n-butyl acrylate, 1 part of 2,2'-azobis(4-methoxy-2,4-dimethylvalelonitrile) (available from Wako Junyaku Co., Ltd. as V-70) and 750 parts of cyolohexanone, and reacted at 35° C. for 15 hours in a nitrogen atmosphere.

The obtained resin had a solid content of 40%, an average molecular weight of 58,000 and an acid value of 18. Oxirane rings were identified by IR spectrum.

Reference Example 4

Preparation of a resin having both hydrophilic groups and crosslinkable groups

A four neck 2 liter flask equipped with a stirrer, a condenser, a nitrogen gas inlet and a thermometer was charged with 500 parts of a xylene solution (solid content 90%) of polybutadiene polybutadiene with a presumed average molecular weight of 45,000 (available from Kuraray Co., Ltd. as LIR-300), 30 parts of maleic anhydride and one part of N-phenyl-1,3-dimethylbutyl)-p-phenyldiamine (available from Ohuchi Shinko chemical Industries Ltd. as NOCRAC 6C, and reacted at 190° C. for 6 hours in a nitrogen atmosphere.

The obtained maleic polybutadiene had an average molecular weight of about 48,000 and an acid value of 72.

Example 1

Dispersing Process

One part of 2,2'-azobis-2,4-dimethylvaleronitrile (available from Wako Junyaku Co., Ltd. as V-65) and 300 parts of the resin of Reference Example 1 neutralized 100% with ammonia were uniformly mixed, to which 900 parts of deionized water was added and emulsified at 40° C. for 30 minutes by a homogenizer.

Crosslinking Process

The obtained emulsion was charged to a 2 liter four neck flask equipped with a stirrer, a condenser, a nitrogen gas inlet and a thermometer and reacted at 75° C. for one hour in a nitrogen atmosphere.

Removing Organic Solvent

The obtained emulsion was subjected to an evaporation of the solvent at a pressure of 20 mmHg at 40.

The resultant resin emulsion contained resin particles of 0.28 micron determined by a laser light scattering method.

Example 2

Dispersing Process

One part of 2,2'-azobis-2,4-dimethylvaleronitrile (available from Wako Junyaku Co., Ltd. as V-65) and 300 parts of the resin of Reference Example 2 neutralized 60% with dimethylethanolamine were uniformly mixed, to which 900 parts of deionized water was added and emulsified at 40° C. for 30 minutes by a homogenizer.

Crosslinking Process

The obtained emulsion was charged to a 2 liter four neck flask equipped with a stirrer, a condenser, a nitrogen gas inlet and a thermometer and reacted at 75° C. for one hour in a nitrogen atmosphere.

Removing Organic Solvent

The obtained emulsion was subjected to an evaporation of the solvent at a pressure of 20 mmHg at 40.

The resultant resin emulsion contained resin particles of 0.15 micron determined by a laser light scattering method.

Example 3

Dispersing Process

Two parts of tris(dimethylaminomethyl)phenol (available from Anker Chemical Co., Ltd. as Ankamine K-54 and 300 parts of the resin of Reference Example 3 were uniformly mixed, to which 500 parts of deionized water was added and emulsified at 40° C. for 30 minutes by a homogenizer.

Crosslinking Process

The obtained emulsion was charged to a 2 liter three neck flask equipped with a stirrer, a condenser and a thermometer and reacted at 40° C. for 24 hours.

Removing Organic Solvent

The obtained emulsion was subjected to an evaporation of the solvent at a pressure of 20 mmHg at 40.

The resultant resin emulsion contained resin particles of 6.68 micron determined by a laser light scattering method.

Example 4

Dispersing Process

The resin of Reference Example 4 of 240 parts was diluted with 160 parts of xylene and then neutralized with dimethylethanolamine 100%. The resultant solution and 2.4 parts of t-butylperoxide were uniformly mixed, to which 1,800 parts of deionized water and 200 parts of n-propyl alcohol were added and emulsified at 40° C. for 30 minutes by a homogenizer.

Crosslinking Process

The obtained emulsion was charged to a 2 liter four neck flask equipped with a stirrer, a condenser, a nitrogen gas inlet and a thermometer and reacted at 60° C. for 6 hours in a nitrogen atmosphere by adding 2.4 parts of tetramethylenepentamine as a reducing agent.

Removing Organic Solvent

The obtained emulsion was subjected to an evaporation of the solvent at a pressure of 20 mmHg at 40.

The resultant resin emulsion contained resin particles of 0.20 micron determined by a laser light scattering method.

Reference Example 5

Preparation of a resin having both hydrophilic groups and crosslinkable groups

To 200 parts of an 80% cyclohexanone solution of polytetramethylene glycol (available from Sanyo Kasei Co., Ltd. as PTMG 1,000) were added dropwise using a dropping funnel 35.9 parts of itaconic anhydride and reacted 150° C. for one hour. The obtained resin had a solid content of 83% and an average molecular weight of 1,200. Polymerizable double bonds are identified by an IR spectrum.

Example 5

Dispersing Process 1.6 part of 2,2'-azobis-2,4-dimethylvaleronitrile (available from Wako Junyaku Co., Ltd. as V-65) and 200 parts of the resin of Reference Example 5 neutralized 100% with ammonium were uniformly mixed, to which 500 parts of deionized water was added and emulsified at 40° C. for 30 minutes by a homogenizer.

Crosslinking Process

The obtained emulsion was charged to a one liter three neck flask equipped with a stirrer, a condenser and a thermometer and reacted at 75° C. for one hour in a nitrogen atmosphere.

Removing Organic Solvent

The obtained emulsion was subjected to an evaporation of the solvent at a pressure of 20 mmHg at 40.

The resultant resin emulsion contained resin particles of 0.34 micron determined by a laser light scattering method.

Example 6

The emulsions of Examples 1 to 5 was subjected to a storage stability test at 25° C. for 3 months, but no separation and sedimentation were observed. All emulsion had good storage stability.

Example 7

Three parts of calcium chloride was added in the emulsion of Example 1 to agglomerate particles which were separated from the aqueous medium by a reduced pressure filtrate method. The obtained particles were dried at 40° C. and 1–2 mmHg for 12 hours to obtain dried particles of about 300 parts.

Example 8

The emulsion was frozen at −50° C. and dried by freeze-drying to obtain dried particles of about 300 parts.

Reference Example 6

Preparation of polybutadine having amino groups

Polybutadiene having an average molecular weight of 2,000 and 1.2 bond of 65% (available from Nippon Oil Company Ltd. as Nisseki Polybutadiene B-2,000) was treated with peracetate to obtain epoxidized polybutadine having an oxirane oxygen content of 6.4%.

A 2 liter autoclave was charged with 1,000 g of the epoxidized polybutadiene and 354 g of ethyleneglycol monoethyl ether, to which 62.1 g of dimethylamine was added and reacted at 150° C. for 5 hours. After distilling unreacted amine away, it was cooled to 120° C. and a mixture of 79.3 g of acrylic acid, 7.6 g of hydroquinone and 26.4 g of ethyleneglycol monoethyl ether was added and reacted at 120° C. for 3¾ hours. The obtained resin had an amine value of 85.2 mmol/100 g, an acid value of 10.0 mmol/100 g and a solid content of 75.0%.

Reference Example 7

Preparation of aminated epoxy resin 1,900 parts of Epicot 1004 (bisphenol type epoxy resin having an epoxy equivalent of 950 available from Yuka Shell Epoxy Co., Ltd.) was dissolved in 685.3 parts of xylene, to which 112.7 parts of n-methylethanolamine was added and reacted at 130° C. for three hours.

Thereafter, 2.1 parts of hydroquinone and 0.6 parts of quinone were added and mixed and, after an addition of 43.1 parts of methacrylic acid, reacted at 110° C. for three hours. Then, 216 parts Of methyl isobutyl ketone was added to obtain an aminated epoxy resin. The resin had an amine value of 73 mmol/100 g solid and a solid content of 70%.

Example 9

Eighty parts of the aminated polybutadiene of Reference Example 6 was mixed with 2.0 parts of glacial acetic acid at 55° C. and 3.0 parts of azobisisobutylonitrile was then added .and mixed. Then, 215 parts of deionized water was added thereto and emulsified to form a resin emulsion. The resin emulsion was transparently dissolved in tetrahydrofurane.

The emulsion was kept at 55 for three days and cooled to form a cationic resin particle dispersion. This dispersion was not dissolved in tetrahydrofurane to form a white semiopaque solution.

A degreased polished steel panel was cationically electrocoated in the above obtained cationic dispersion. The coated article was baked at 170° C. for 20 minutes to form a clear coating of 20 micron. A 60° gloss was evaluated and the result is shown in Table 1.

Example 10

One hundred parts of the aminated epoxy resin of Reference Example 7 was mixed with 3.0 parts of glacial acetic acid at 55° C. and 2.0 parts of azobisisobutylonitrile was then added and mixed. Then, 362 parts of deionized water was added thereto and emulsified to form a resin emulsion. The resin emulsion was transparently dissolved in tetrahydrofurane.

The emulsion was kept at 55 for three days and cooled to form a cationic resin particle dispersion. This dispersion was not dissolved in tetrahydrofurane to form a white semiopaque solution.

A degrease polished steel panel was cationically electrocoated in the above obtained cationic dispersion. The coated article was baked at 170° C. for 20 minutes to form a clear coating of 20 micron. A 60° gloss was evaluated and the result is shown in Table 1.

TABLE 1

| Examples | 60° Gloss[1] |
|---|---|
| 1 | 10 |
| 2 | 12 |

[1]Gloss was measured at an incidence angle of 60°.

Reference Example 8

Preparation of a resin having both hydrophilic groups and crosslinkable groups

Forty parts of 2-hydroxyethyl methacrylate, 4 parts of N,N-dimethylbenzylamine and 300 parts of xylene were added to the maleic polybutadiene of Reference Example 4, and reacted at 135° C. for 30 minutes. The obtained resin had an average molecular weight of 52,000 and an acid value of 35.

Example 11

Dispersing Process

One part of 2,2'-azobis-2,4-dimethylvaleronitrile (available from Wako Junyaku Co., Ltd. as V-65) and 300 parts of the resin of Reference Example 8 neutralized 100% with ammonia were uniformly mixed, to which 900 parts of deionized water was added and emulsified at 40° C. for 30 minutes by a homogenizer.

Crosslinking Process

The obtained emulsion was charged to a 2 liter four neck flask equipped with a stirrer, a condenser, a nitrogen gas inlet and a thermometer and reacted at 75° C. for one hour in a nitrogen atmosphere.

Removing Organic Solvent

The obtained emulsion was subjected to an evaporation of the solvent at a pressure of 20 mmHg at 40.

The resultant resin emulsion contained resin particles of 0.40 micron determined by a laser light scattering method.

What is claimed is:

1. A process for preparing crosslinked resin particles which comprises dispersing in an aqueous medium a water-dispersible resin having both water-dispersible groups and self-crosslinkable groups in one molecule and then three-dimensionally crosslinking said resin, wherein said water-dispersible groups are selected from the group consisting of nonionic groups, ionic groups, and amphoteric groups, and said self-crosslinkable groups are selected from the group consisting of methacryloyl groups, acryloyl groups, 2-(1-carboxypropenoyl) groups and a combination of groups reactive with each other selected from a combination of oxirane and carboxyl groups or a combination of hydroxyl and alkoxy groups.

2. The process according to claim 1, wherein the crosslinked resin particles thus-produced are subsequently separated from the aqueous medium.

3. The process according to claim 1 wherein said water-dispersible resin is an adduct of aminated polybutadiene and methacrylic acid, or a half ester of maleic polybutadiene and 2-hydroxyethyl methacrylate.

4. The process according to claim 1 wherein said three-dimensionally crosslinking is assisted by a crosslinking catalyst or a polymerization initiator.

5. The process according to claim 1 wherein said resin particles have a particle size of 0.01 to 50 micron.

6. The process according to claim 1 wherein said resin particles have a particle size of 0.01 to 10 micron.

7. The process according to claim 1 wherein said water-dispersible resin having both water-dispersible groups and self-crosslinkable groups has an average molecular weight of 500 to 1,000,000.

8. The process according to claim 7 wherein said resin has an average molecular weight of 1,000 to 100,000.

9. The process according to claim 7 wherein said water-dispersible resin is selected from the group consisting of acryl resin, a polyester and an elastomer.

10. An aqueous emulsion containing the crosslinked resin particles produced according to the process of claim 1.

11. A process for preparing an aqueous emulsion containing crosslinked resin particles, comprising redispersing the resin particles prepared by the process according to claim 2 in an aqueous medium.

12. Crosslinked resin particles prepared by the process according to claim 2.

13. A cationically electrocoating composition containing the crosslinked resin particles prepared by the process according to claim 2.

* * * * *